(12) United States Patent
Carle et al.

(10) Patent No.: US 12,365,471 B2
(45) Date of Patent: Jul. 22, 2025

(54) AIRCRAFT WITH AN UNDUCTED FAN PROPULSOR

(71) Applicant: General Electric Company, Schenectady, NY (US)

(72) Inventors: Sara Elizabeth Carle, Columbus, OH (US); Daniel L Tweedt, West Chester, OH (US); Syed Arif Khalid, West Chester, OH (US); Andrew Breeze-Stringfellow, Montgomery, OH (US); William Bowden, Cleves, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/230,609

(22) Filed: Aug. 4, 2023

(65) Prior Publication Data

US 2025/0042558 A1  Feb. 6, 2025

(51) Int. Cl.
*B64D 27/12* (2006.01)
*B64C 11/30* (2006.01)

(52) U.S. Cl.
CPC ............ *B64D 27/12* (2013.01); *B64C 11/305* (2013.01)

(58) Field of Classification Search
CPC .............................. B64D 27/12; B64C 11/305
See application file for complete search history.

(56) References Cited

U.S. PATENT DOCUMENTS

| | | |
|---|---|---|
| 5,079,916 A | 1/1992 | Johnson |
| 5,135,185 A | 8/1992 | Adamson |
| 8,714,475 B2 | 5/2014 | Gall |
| 9,242,721 B2 | 1/2016 | Neuteboom |
| 9,567,090 B2 | 2/2017 | Gallet |
| 9,759,160 B2 | 9/2017 | Sankrithi |
| 10,040,559 B2 | 8/2018 | Hoisington |
| 10,442,541 B2 | 10/2019 | Miller |
| 10,669,881 B2 | 6/2020 | Breeze-Stringfellow |
| 10,907,495 B2 | 2/2021 | Breeze-Stringfellow |
| 11,136,109 B2 | 10/2021 | Wood |
| 2012/0119023 A1 | 5/2012 | Moore |

(Continued)

FOREIGN PATENT DOCUMENTS

| | | |
|---|---|---|
| FR | 3127024 | 3/2023 |
| FR | 3127025 | 3/2023 |
| FR | 3127269 | 3/2023 |

(Continued)

OTHER PUBLICATIONS

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

(Continued)

*Primary Examiner* — Joshua J Michener
*Assistant Examiner* — Cindi M Curry
(74) *Attorney, Agent, or Firm* — Fitch Even Tabin & Flannery, LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

23 Claims, 11 Drawing Sheets

(56) References Cited

U.S. PATENT DOCUMENTS

2023/0021836 A1  1/2023  Riddle

FOREIGN PATENT DOCUMENTS

| | | |
|---|---|---|
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

OTHER PUBLICATIONS

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.

AIRCRAFT WITH AN UNDUCTED FAN PROPULSOR

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

Figure 5:
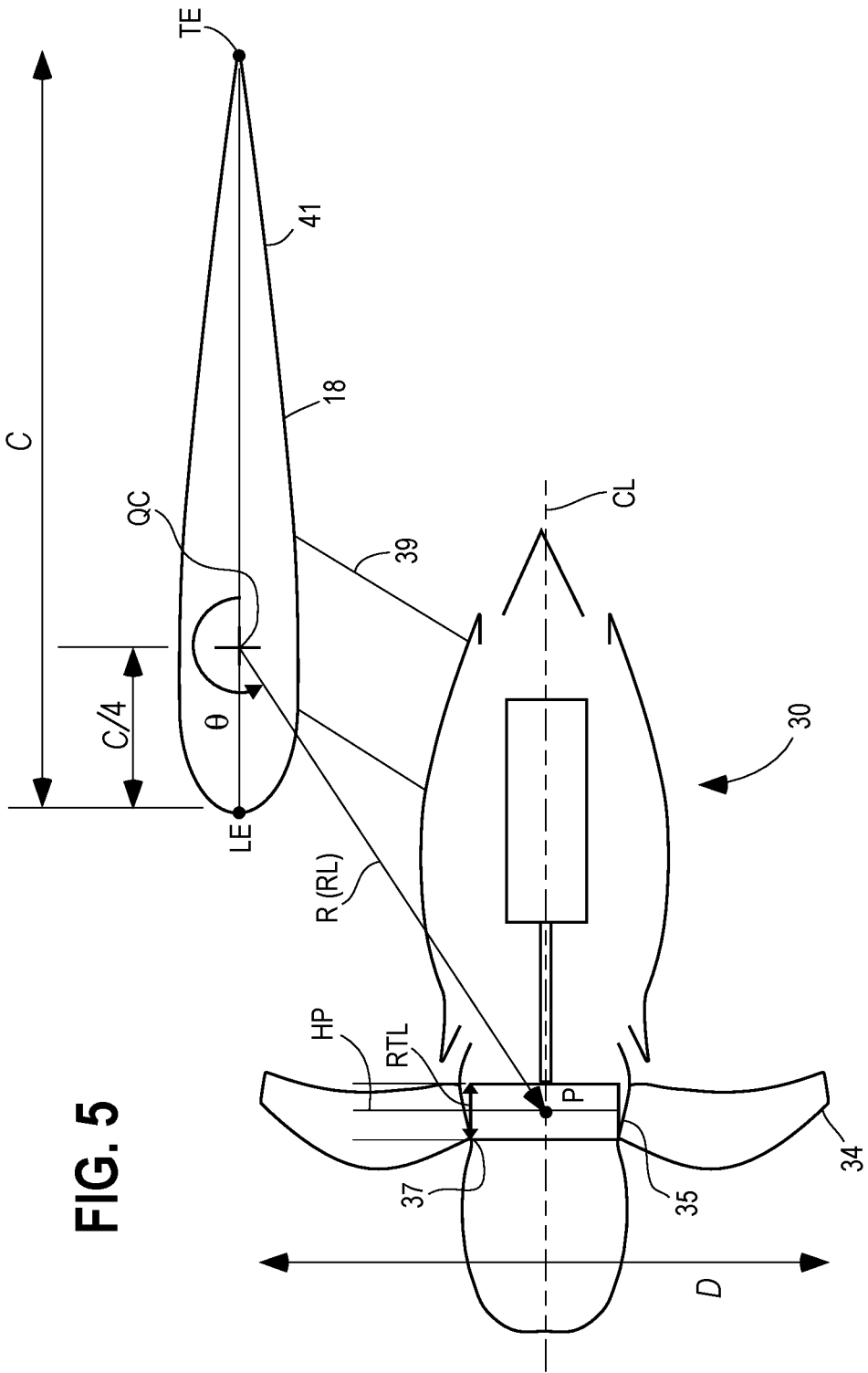
FIG. 5 comprises a schematic side elevation view showing the location of one of the unducted fan propulsors of FIG. 3 relative to one of the forward wings of the aircraft of FIG. 1.
Figure 6:
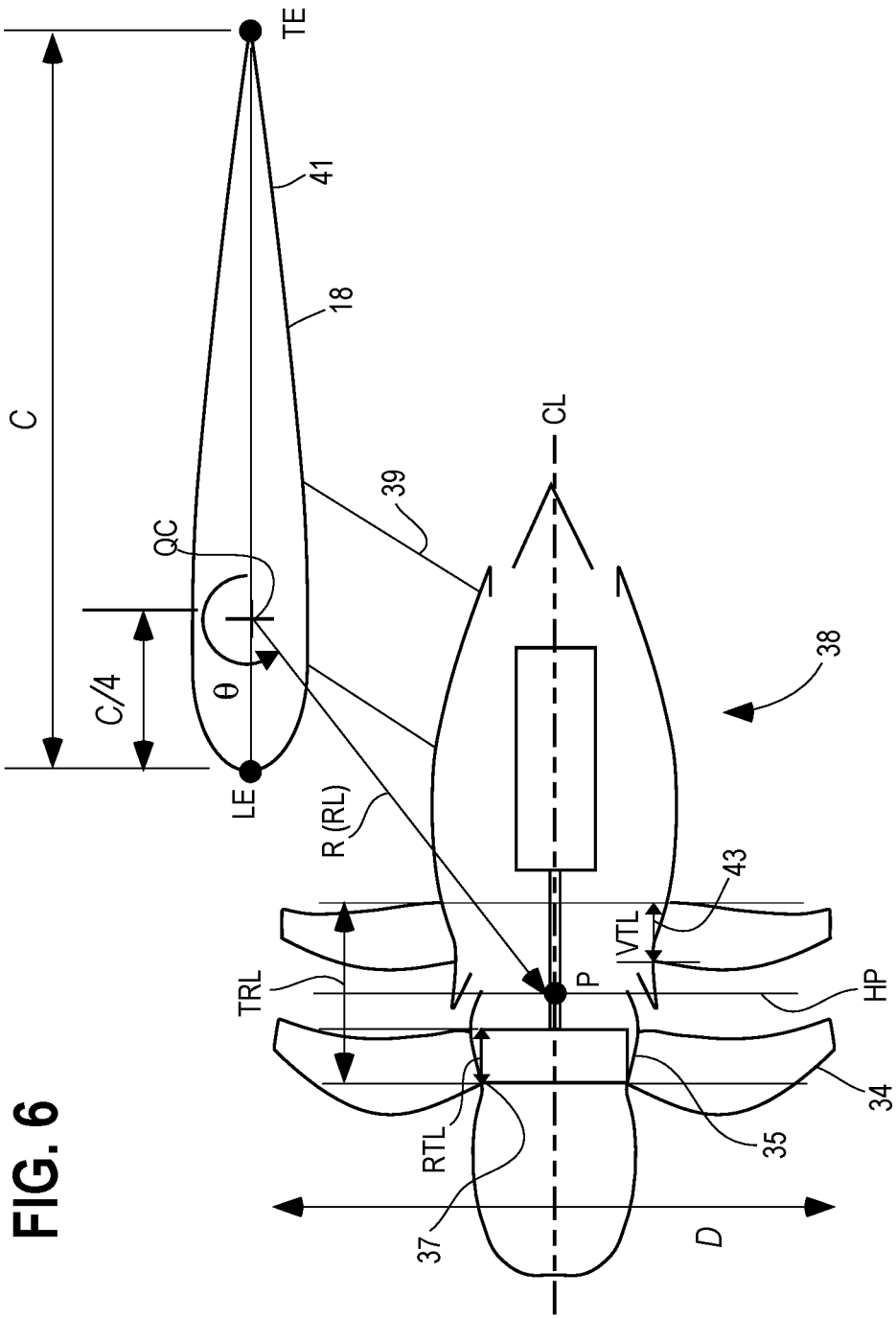
FIG. 6 comprises a schematic side elevation view similar to that of FIG. 5, showing the location of one of the unducted fan propulsors of FIG. 4 relative to one of the forward wings of the aircraft.

"Airfoil section" is defined as the average of a first offset plane section and a second offset plane section of the airfoil, where the first offset plane section is the section of the airfoil taken at a first plane and the second offset plane section is the section of the airfoil taken at a second plane, the first and second planes being offset perpendicular to, and equidistant from a central plane by a distance of ½ the maximum fan diameter (D) for the rotating blades, and where the central plane passes through the axis of rotation of the rotating blades and includes the vertical direction (parallel to the direction of gravity) when the aircraft is on the ground. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 5, 6 and 6B and the corresponding airfoil section shown represents the average of the first section and the second section. Defining the airfoil section in this manner advantageously avoids intersections with mounting systems, such as a pylon.

"Quarter-chord position" ("QC") is defined as ¼ of the distance from the leading edge of the airfoil section along the chord of the airfoil section.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

Installing an unducted fan propulsion system presents the challenge of addressing penalties that can result due to the interaction with the rest of the aircraft. The manner in which these penalties are addressed is unique for this type of engine, and unlike how related penalties have previously been addressed for turboprops or ducted propulsion systems. For example, the interaction of the propulsor flow stream with the wing can produce scrubbing and interference drag. Thus, it would be desirable to improve the positioning of the unducted fan propulsion system on the aircraft to reduce the penalties as well as increase the thrust of the propulsor to offset remaining penalties.

As explained below, after recognizing the flow characteristics of an aircraft and an unducted fan propulsor, the inventors were able to establish criteria for positioning the propulsor relative to an aircraft airfoil section for enhanced thrust without a conventional iterative process. In particular, certain relationships between the quarter-chord position of an airfoil section and a propulsor centerline (midway between the propulsor blade roots) can be utilized to identify a region for positioning unducted fan propulsors to improve aircraft performance and efficiency. Thus, mounting unducted fan propulsors relative to the quarter-chord position of the airfoil section as described in embodiments provided herein improves aircraft performance over other mounting locations, including conventional mounting locations that are more forward of, and more in line with, a wing chord line.

Various aspects of the present disclosure describe aspects of an aircraft characterized in part by a specific relation between a quarter-chord position of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
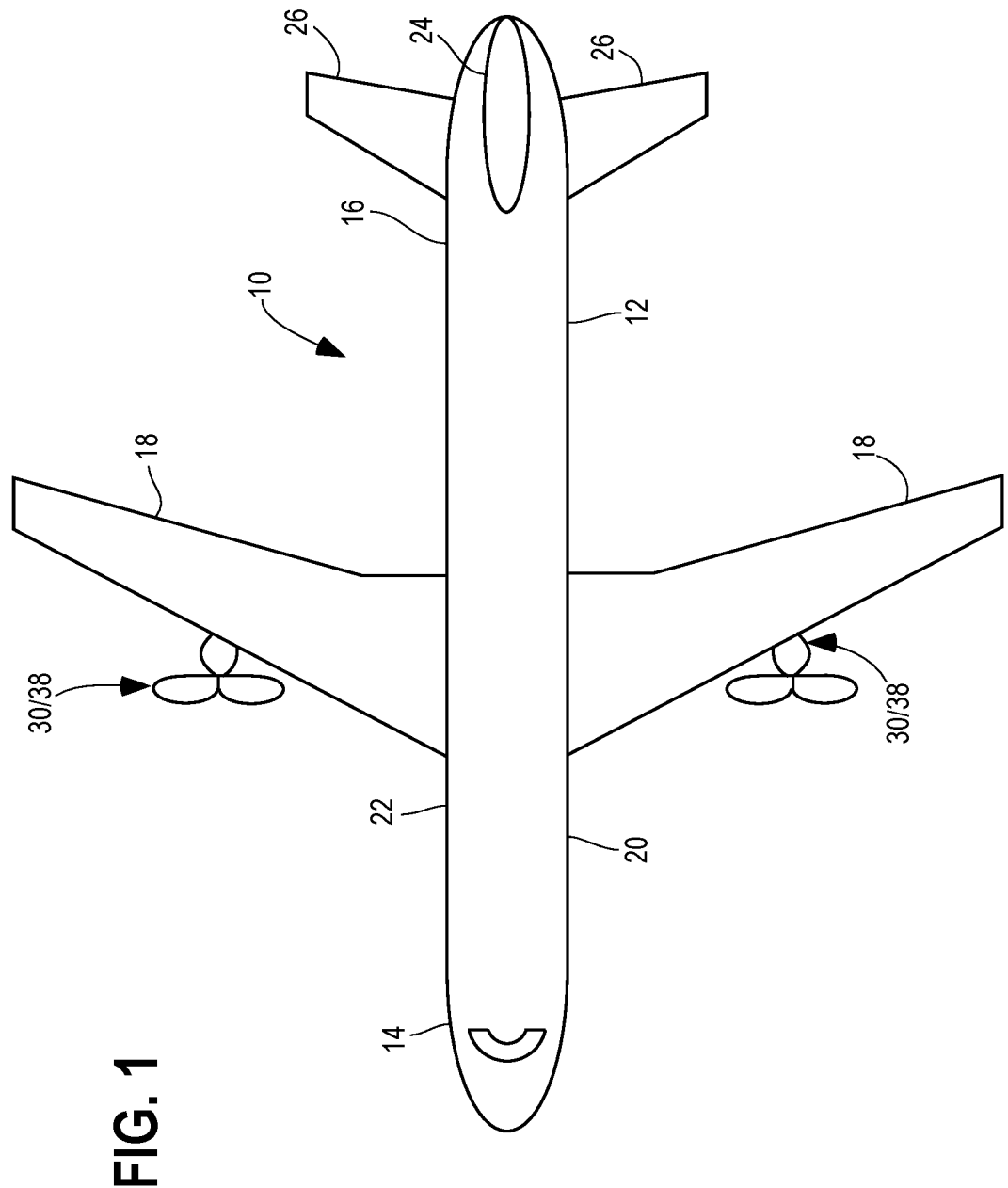
FIG. 1 comprises atop plan view of an aircraft as configured in accordance with various embodiments of these teachings, with undermounted, unducted fan propulsors mounted on forward wings of the aircraft.
Figure 2:
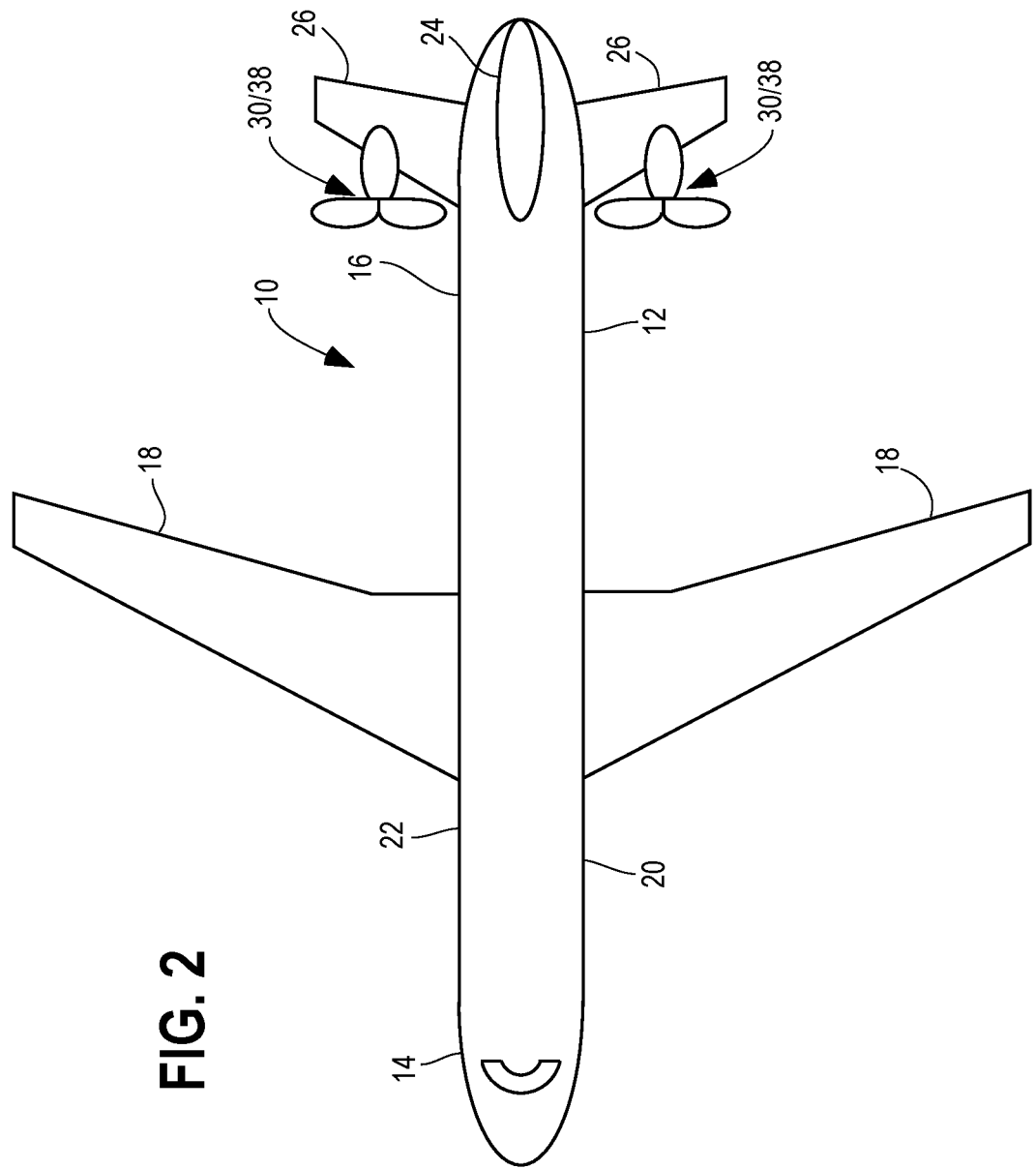
FIG. 2 comprises atop plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 30 or 38 is undermounted relative to each of the wings 18, as shown in the embodiment of FIG. 1. Alternatively, the unducted fan propulsor 30 or 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

Figure 3:
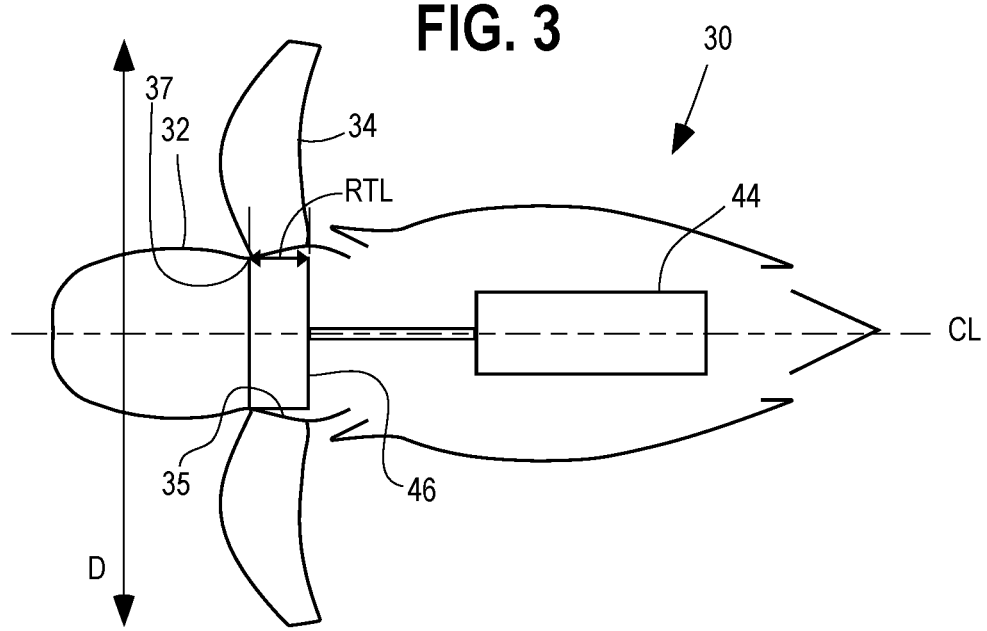
FIG. 3 comprises an elevational cross-sectional view of an exemplary unducted fan propulsor having a plurality of blades arranged in a single array.

FIG. 3 shows an elevational cross-sectional view of an embodiment of one of the unducted fan propulsors 30. As is seen from FIG. 3, the unducted fan propulsor 30 takes the form of an open fan propulsion system and has a rotating element in the form of rotatable propeller assembly 32 on which is mounted a first array of blades 34 around an axial centerline CL of the unducted fan propulsor 30. The first array of blades 34 defines a diameter D representing the tip-to-tip diameter of the blades and a maximum radial extent from the axial centerline CL. This diameter D is measured along a radial direction perpendicular to the axial centerline CL. Each of the blades 34 has a root 35 where the blade 34 is attached to the rotatable propeller assembly 32, and each blade 34 defines a root length (RTL). The root length (RTL) is defined as the axial extent (in a direction parallel to the axial centerline CL) from the radially innermost leading edge (LE) of the blade 34 airfoil, e.g., closest to the axial centerline CL, to the axial location of the radially innermost trailing edge (TE) of the blade 34 airfoil.

Figure 4:
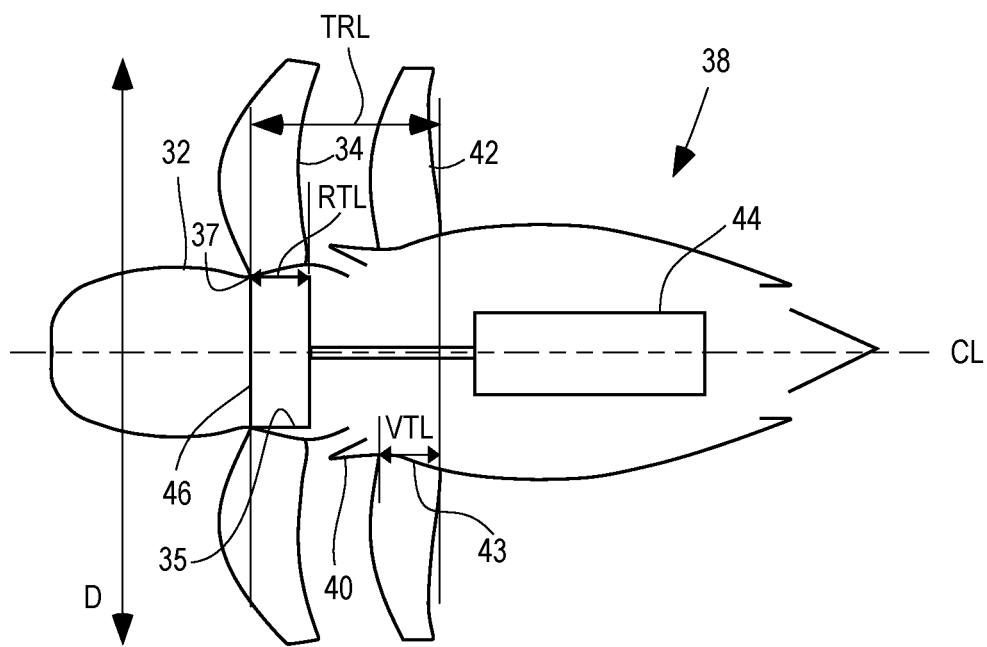
FIG. 4 comprises an elevational cross-sectional view of an exemplary unducted fan propulsor having a plurality of blades arranged in a forward array and a rearward array.

FIG. 4 shows an elevational cross-sectional view of an embodiment of an alternative one of the unducted fan propulsors 38. Like the embodiment of FIG. 3, the unducted fan propulsor 38 of FIG. 4 takes the form of an open fan propulsion system and has a rotating element in the form of rotatable propeller assembly 32 on which is mounted a first array of blades 34 around an axial centerline CL of the unducted fan propulsor 30. The unducted fan propulsor 38 of FIG. 4 differs from that of FIG. 3 in that the former includes a second array of blades or vanes, which can either be rotating—such as counter-rotating—or stationary. In some embodiments, a non-rotating stationary element in the form of vane assembly 40 includes an array of vanes 42 disposed around the axial centerline CL. The first array of blades 34 defines a diameter D representing the tip-to-tip diameter of the blades and a maximum radial extent from the axial centerline CL. This diameter D is measured along a radial direction perpendicular to the axial centerline CL. Each of the blades 34 has a root where the blade 34 is attached to the rotatable propeller assembly 32 with a blade root length RTL. Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 4 and 6. TRL is a measured axial distance from the radial innermost LE of the foremost row of blades/vanes blade airfoil and the trailing edge (TE) of the vanes 42. In some embodiments, the vanes 42 may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having any number of rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rear edge of the root of the aftmost blade/vane of the unducted fan propulsor.

For purposes that will be explained herein, each of the unducted fan propulsors 30 and 38 has a point P. The point P is defined differently depending upon whether the unducted fan propulsor 30 has a single rotating element with a plurality of blades 34 or whether the unducted fan propulsor 38 has multiple rows of rotating blades and/or stationary vanes. For an unducted fan propulsor 30 with a single array with a plurality of blades 34, the point P is located at the intersection of the axial centerline CL and a line perpendicular to the axial centerline CL that passes through a midpoint HP of the root length RTL of any one of the blades 34, as shown in FIG. 5. For an unducted fan propulsor 38 with a first array with plurality of blades 34 and a second array also with a plurality of blades or vanes 42, the point P is located at the intersection of the axial centerline CL and a line perpendicular to the axial centerline CL that passes through a midpoint HP of the total root length TRL between a forward end of the root of one of the blades 34 of the forward array and a rearward end of the root of one of the blades or vanes 42 of the rearward array when aligned with the one of the blades 34 of the forward array, as shown in FIG. 6. In other words, the midpoint HP is equidistant from the forward end of the root of one of the blades 34 and the rearward end of the root of one of the blades or vanes 42. In unducted fan propulsors with multiple rows of blades and/or vanes, the TRL of an unducted fan propulsor is defined as the distance between the LE of the root of the foremost row of blades/vanes and the rear edge of the root of the aftmost blade/vane on the unducted fan propulsor.

As shown in FIGS. 3 and 4, the exemplary unducted fan propulsors 30 and 38 each also include a drive mechanism 44 which provides torque and power to the propeller assembly 32 through a transmission 46. In various embodiments, the drive mechanism 44 may be a gas turbine engine, an electric motor, an internal combustion engine, or any other suitable source of torque and power and may be located in proximity to the propeller assembly 32 or may be remotely located with a suitably configured transmission 46. Transmission 46 transfers power and torque from the drive mechanism 44 to the propeller assembly 32 and may include one or more shafts, gearboxes, or other mechanical or fluid drive systems.

Figure 6A:
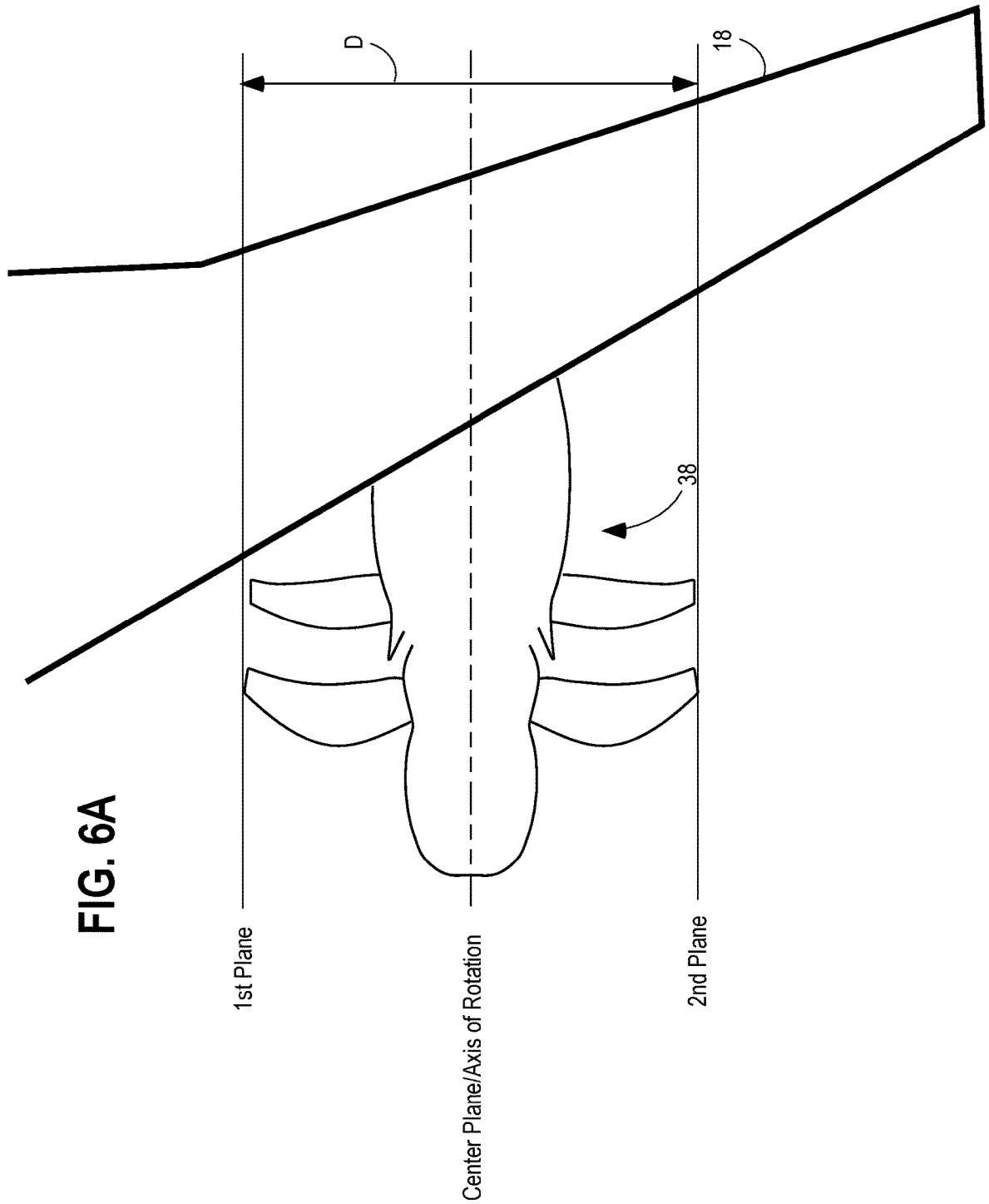
FIG. 6A comprises a top plan view of the propulsor of FIG. 6 and inboard and outboard locations of the wing relative to an unducted fan propulsor centerline, with the inboard and outboard locations in FIG. 6A used to determine a chord length of an airfoil section associated with the unducted fan propulsor.
Figure 6B:
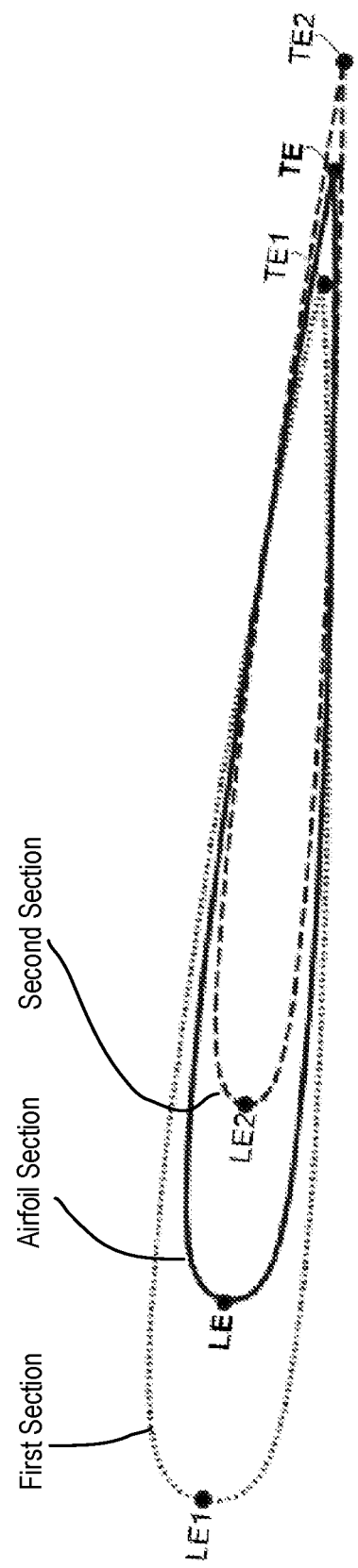
FIG. 6B comprises a schematic side elevation view of a first section and a second section of the wing of FIG. 6, which sections are used in determining the depicted airfoil section.

The unducted fan propulsors 30 or 38 are attached relative to the wings 18, horizontal stabilizer 26, or fuselage either directly or indirectly through one or more intermediate components or features, e.g., a pylon 39, as shown in FIGS. 5, 6 and 6A.

Each of the wings 18 or horizontal stabilizers 26 has an airfoil section 41 associated with it, with the airfoil section being as defined above.

The chord C in FIGS. 5 and 6 is a straight line extending from LE to TE of the airfoil section. The airfoil section can have different shapes than shown for illustration purposes, and may, for example, have a positive camber or a negative camber. For purposes that will be explained herein, the quarter-chord position (QC) of the airfoil section is located on the chord C at a distance of C/4 from the LE of the airfoil section 41.

The position of the open fan propulsor is defined relative to the quarter-chord position of the relevant wing section. Because the wing section associated with the propulsor may be distorted by a mounting system, such as a pylon, the quarter-chord position is measured as ¼ of the distance along the chord from the leading edge of the airfoil section. The airfoil section, as defined above, is the average of a first offset plane section and a second offset plane section of the airfoil, where the first offset plane section is the section of the airfoil taken at a first plane and the second offset plane section is the section of the airfoil taken at a second plane, the first and second planes being offset perpendicular to, and equidistant from a central plane by a distance of ½ the maximum fan diameter (D) for the rotating blades, as shown in FIG. 6A, and where the central plane passes through the axis of rotation of the rotating blades and includes the vertical direction (parallel to the direction of gravity) when the aircraft is on the ground.

There are specific locations that the inventors have found to be advantageous to position the unducted fan propulsors 30 or 38 to generate increased thrust using higher pressure air flow. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein comprises a fuselage, wings and/or stabilizers, and an unducted fan propulsor system (or propulsor). The unducted fan propulsor system, which may be mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design.

Referring to FIGS. 5 and 6, the location of an unducted fan propulsor relative to an airfoil section 41, such as a section of the wing 18 or the horizontal stabilizer 26, is defined herein using a polar coordinate system having a radial component along a positioning line (R) having a positioning line length (RL) and angular component (θ, counter-clockwise positive as shown) with origin (QC) located at the intersection of the airfoil section quarter chord point (C/4) and the straight line extending from the leading edge (LE) to the trailing edge (TE) of the airfoil section. The angle θ is measured from a vector from the QC to the TE of the airfoil section to the positioning line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section.

The location of the unducted fan propulsor relative to the origin depends on the number of arrays of airfoils. When there is a single array of blades (FIG. 5), the unducted fan propulsor location relative to the origin (i.e., point "P") is located at an intersection of the CL and a line perpendicular to the CL that passes through a midpoint between edges at the root of one of the plurality of blades. When there are a forward and rearward array of blades (FIG. 6) the unducted fan propulsor location relative to the origin (i.e., point "P") is located at an intersection of the CL and midpoint between a rearward trailing edge (RTL) of the aft array and leading edge (LE) of the forward array when a blade of the forward and rearward arrays are aligned with each other.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section were found to have advantageous aero performance requirements for an aircraft with an unducted fan propulsor system mounted relative to a wing.

Figure 8:
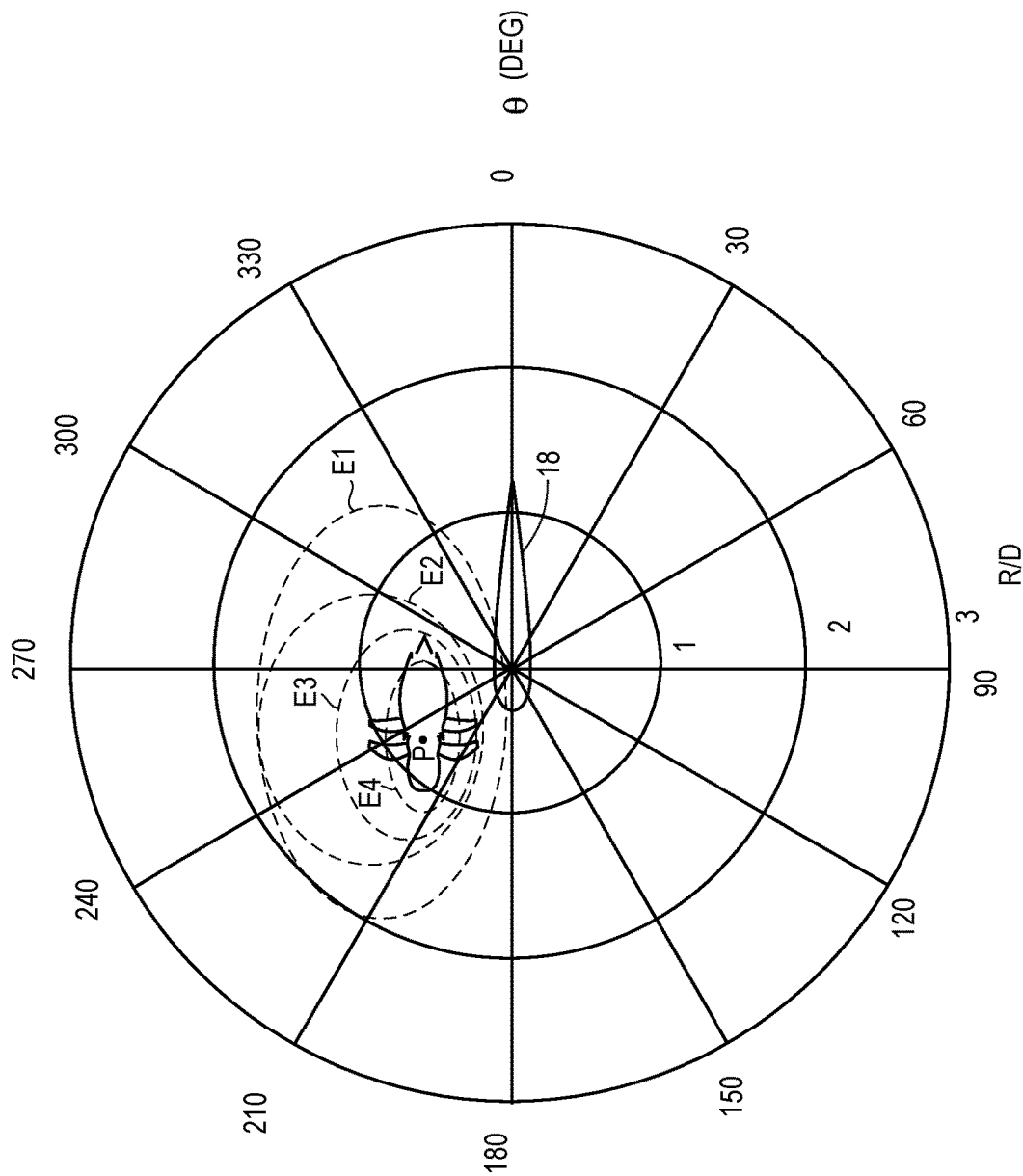
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.
Figure 9:
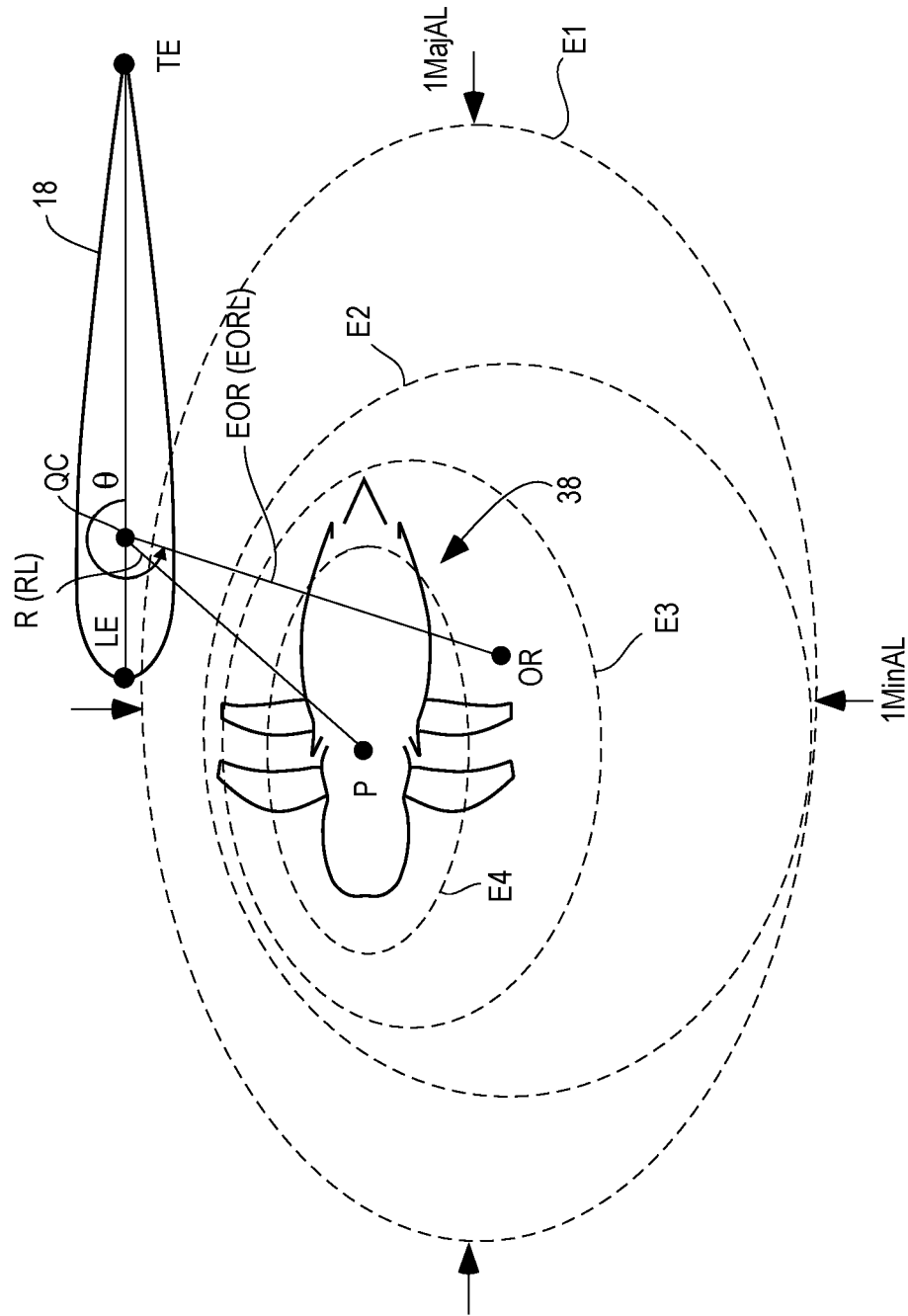
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
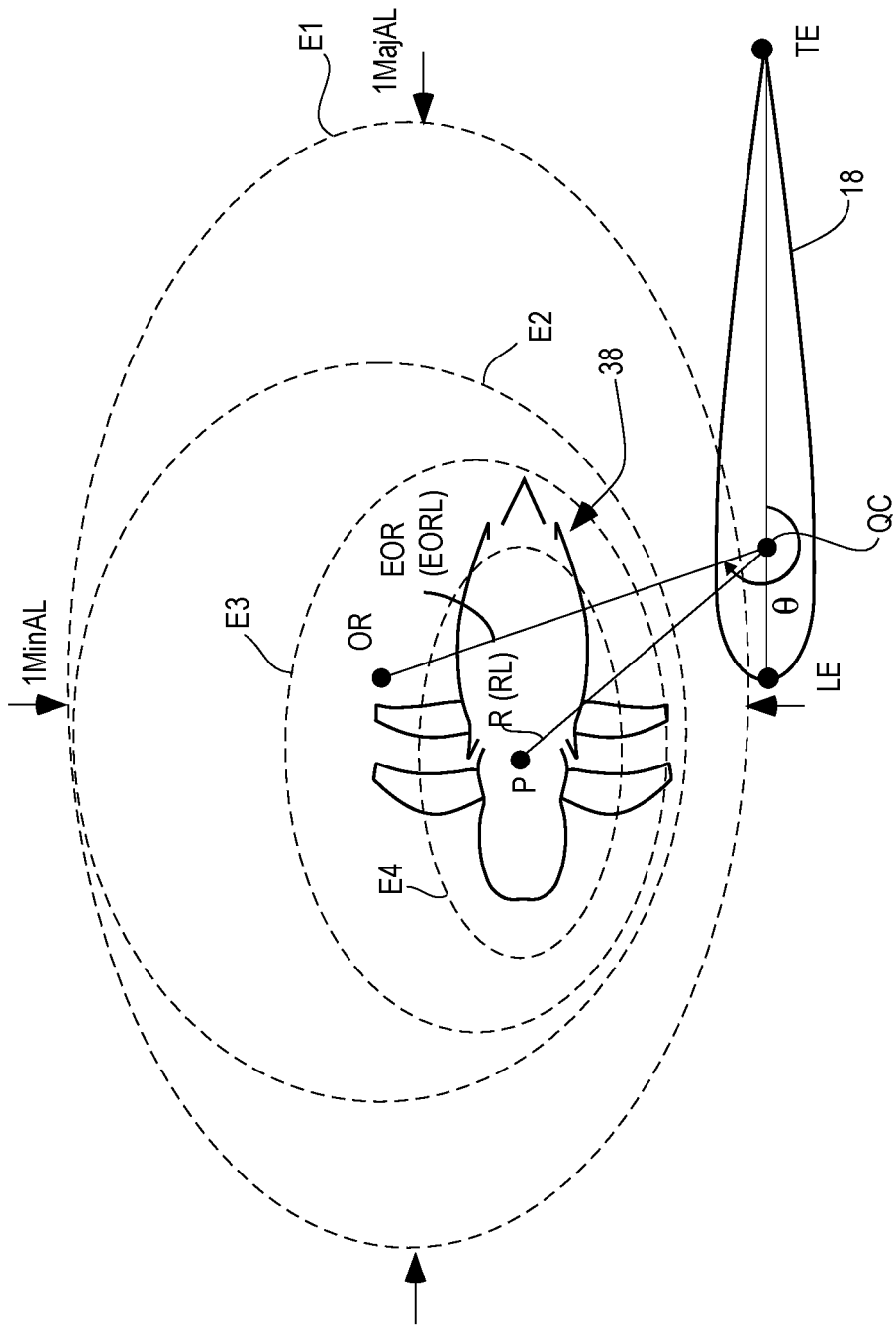
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to the QC of the airfoil section. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. An angle θ for the ellipse origin positioning line EOR is measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 30 or 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7.

In a second embodiment, the point P of the unducted fan propulsor 30 or 38 is located in a second ellipse E2 having a second ellipse origin defined by EORL/D of 1.051 and θ of 228.8°. The second ellipse E2 has a second major axis length (2MajAL) and a second minor axis length (2MinAL), where 2MajAL/D is 1.86 and 2MinAL/D is 1.56.

In a third embodiment, the point P of the unducted fan propulsor 30 or 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9.

In a fourth embodiment, the point P of the unducted fan propulsor 30 or 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44.

The location of the unducted fan propulsor system (i.e. point P) relative to the airfoil section may also be expressed in terms of the following expressions:

$$\frac{RL}{D} + \frac{\left(\sqrt{a*[b*\sin^2(\theta) - c*\cos^2(\theta) + d*\sin(\theta)*\cos(\theta)]} + e*\sin(\theta) + f*\cos(\theta)\right)}{g*\sin^2(\theta) + h*\cos^2(\theta)} > 0$$

and $$\frac{RL}{D} + \frac{\left(-\sqrt{a*[b*\sin^2(\theta) - c*\cos^2(\theta) + d*\sin(\theta)*\cos(\theta)]} + e*\sin(\theta) + f*\cos(\theta)\right)}{g*\sin^2(\theta) + h*\cos^2(\theta)} < 0$$

where 0.065<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsors 30 and 38 can be defined by the above expression, but where 0.254<RL/D<1.86 and θ is between 199° and 306°, and where a, b, c, d, e, f, g and h have the values set forth in the above table under the heading "Sixth Emb."

In a seventh embodiment, the point P of the unducted fan propulsors 30 and 38 can be defined by the above expression, but where 0.369<RL/D<1.43 and θ is between 204° and 291°, and where a, b, c, d, e, f, g and h have the values set forth in the above table under the heading "Seventh Emb.".

In an eighth embodiment, the point P of the unducted fan propulsors 30 and 38 can be defined by the above expression, but where 0.477<RL/D<0.9455 and θ is between 211° and 274°, And where a, b, c, d, e, f, g and h have the values set forth in the above table under the heading "Eighth Emb."

Figure 7:
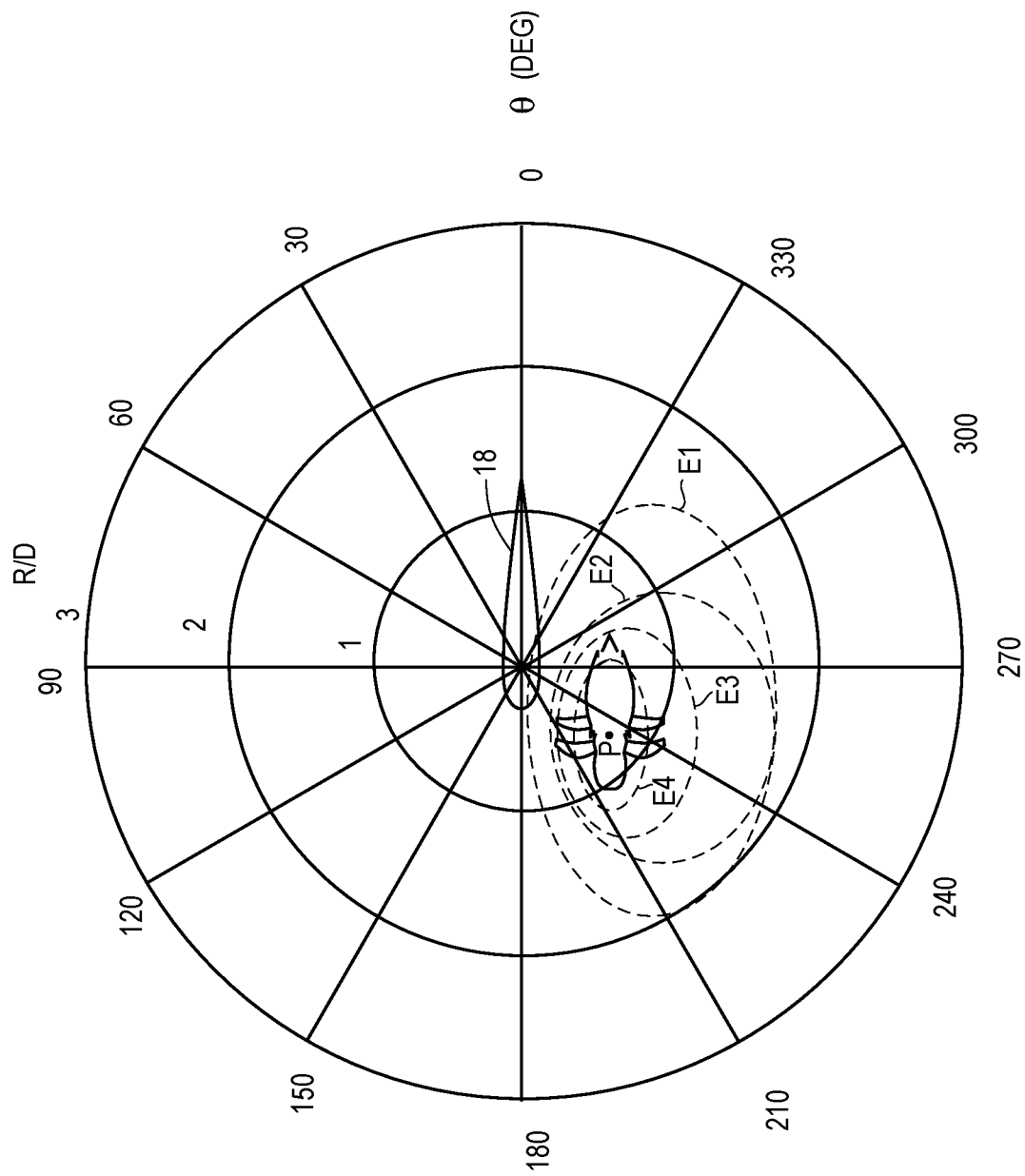
FIG. 7 comprises a schematic side elevation view similar to that of FIG. 6, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system. Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

In any of the foregoing examples or embodiments, the unducted fan propulsor 30, incorporating the vane assembly described herein, can have a cruise flight Mach $M_0$ of between 0.5 and 0.9, between 0.7 and 0.9, or between 0.75 and 0.9. The unducted fan propulsor 30 can be part of a winged aircraft, such as an airplane.

A propulsor that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

Further aspects of the disclosure are provided by the subject matter of the following clauses:

An aircraft is provided that includes a fuselage; an airfoil extending from the fuselage, the airfoil having an airfoil section with a leading edge (LE) and a trailing edge (TE), a chord extending between the LE and TE, and a quarter-chord location (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (RTL) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 228.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

An aircraft is provided including a fuselage; an airfoil extending from the fuselage, the airfoil having an airfoil section with a leading edge (LE) and a trailing edge (TE), a chord extending between the LE and TE, and a quarter-chord location (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (RTL) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and θ is between 187° and 340°, and wherein RL/D and θ of the P of the unducted fan propulsor adhere to the following expressions:

$$\frac{RL}{D} + \frac{\left(\sqrt{1.4161*\left[1.88978*\sin^2(\theta) - 0.0875*\cos^2(\theta) + 0.477*\sin(\theta)*\cos(\theta)\right]} + 1.764*\sin(\theta) + 0.19146*\cos(\theta)\right)}{1.96*\sin^2(\theta) + 0.7225*\cos^2(\theta)} > 0$$

and $$\frac{RL}{D} + \frac{\left(-\sqrt{1.4161*\left[1.88978*\sin^2(\theta) - 0.0875*\cos^2(\theta) + 0.477*\sin(\theta)*\cos(\theta)\right]} + 1.764*\sin(\theta) + 0.19146*\cos(\theta)\right)}{1.96*\sin^2(\theta) + 0.7225*\cos^2(\theta)} < 0.$$

In the preceding clause, 0.254<RL/D<1.86 and θ is between 199° and 306°, and the P of the unducted fan propulsor is defined by the following expressions:

$$\frac{RL}{D} + \frac{\left(\sqrt{0.52621*\left[0.7205*\sin^2(\theta) - 0.352*\cos^2(\theta) + 0.7448*\sin(\theta)*\cos(\theta)\right]} + 0.8476*\sin(\theta) + 0.23119*\cos(\theta)\right)}{0.8649*\sin^2(\theta) + 0.6084*\cos^2(\theta)} > 0$$

and $$\frac{RL}{D} + \frac{\left(-\sqrt{0.52621 * [0.7205 * \sin^2(\theta) - 0.352 * \cos^2(\theta) + 0.7448 * \sin(\theta) * \cos(\theta)]} + 0.8476 * \sin(\theta) + 0.23119 * \cos(\theta)\right)}{0.8649 * \sin^2(\theta) + 0.6084 * \cos^2(\theta)} < 0.$$

In any of the two preceding clauses, $0.369 < RL/D < 1.43$ and $\theta$ is between $204°$ and $291°$, and the P of the unducted fan propulsor is defined by the following expressions:

$$\frac{RL}{D} + \frac{\left(\sqrt{0.52621 * [0.7205 * \sin^2(\theta) - 0.352 * \cos^2(\theta) + 0.7448 * \sin(\theta) * \cos(\theta)]} + 0.8476 * \sin(\theta) + 0.23119 * \cos(\theta)\right)}{0.8649 * \sin^2(\theta) + 0.6084 * \cos^2(\theta)} > 0$$

and $$\frac{RL}{D} + \frac{\left(-\sqrt{0.52621 * [0.7205 * \sin^2(\theta) - 0.352 * \cos^2(\theta) + 0.7448 * \sin(\theta) * \cos(\theta)]} + 0.8476 * \sin(\theta) + 0.23119 * \cos(\theta)\right)}{0.8649 * \sin^2(\theta) + 0.6084 * \cos^2(\theta)} < 0.$$

In any of the three preceding clauses: $0.477 < RL/D < 0.9455$ and $\theta$ is between $211°$ and $274°$, and the P of the unducted fan propulsor is defined by the following expressions:

$$\frac{RL}{D} + \frac{\left(\sqrt{0.01069156 * [0.036 * \sin^2(\theta) - 0.3485 * \cos^2(\theta) + 0.5418 * \sin(\theta) * \cos(\theta)]} + 0.139167 * \sin(\theta) + 0.020812 * \cos(\theta)\right)}{0.2209 * \sin^2(\theta) + 0.0484 * \cos^2(\theta)} > 0$$

and $$\frac{RL}{D} + \frac{\left(-\sqrt{0.01069156 * [0.036 * \sin^2(\theta) - 0.3485 * \cos^2(\theta) + 0.5418 * \sin(\theta) * \cos(\theta)]} + 0.139167 * \sin(\theta) + 0.020812 * \cos(\theta)\right)}{\left(0.2209 * \sin^2(\theta) + 0.0484 * \cos^2(\theta)\right)} < 0.$$

In any of the four preceding clauses, the unducted fan propulsor is undermounted to the airfoil, such as a wing, with one or more intermediate structures.

In any of the five preceding clauses, the P of the unducted fan propulsor is variable to accommodate different operating conditions.

An aircraft is provided that includes a fuselage; an airfoil extending from the fuselage, the airfoil having an airfoil section with a leading edge (LE) and a trailing edge (TE), a chord extending between the LE and TE, and a quarter-chord location (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (RTL) of the rearward array and leading edge (LE) of the forward array when a blade of the forward and rearward arrays are aligned with each other; and a positioning line (R) having a length (RL) and extending from the QC to the point P of the unducted fan propulsor and at an angle $\theta$ as measured from a vector from the QC to the TE of the airfoil section to the line R, where, when viewed with the LE to the left of TE, a positive $\theta$ (1) increases in a counter-clockwise direction when the high pressure side of the airfoil section is below the airfoil section, and (2) increases in a clockwise direction when the high pressure side of the airfoil section is above the airfoil section, and wherein $RL/D \leq 2$ and $\theta$ is between $187°$ and $342°$.

In any of the foregoing clauses, $0.15 \leq RL/D$.

In any of the foregoing clauses, $0.35 \leq RL/D$, and preferably $RL/D$ is about $0.72$.

In any of the foregoing clauses, wherein $\theta$ is between $198°$ and $310°$, and preferably between $205°$ and $285°$.

In any of the foregoing clauses, the unducted fan propulsor operates at a cruise flight Mach $M_0$ of between $0.5$ and $0.9$, preferably between $0.7$ and $0.9$, and more preferably between $0.75$ and $0.9$.

In any of the foregoing clauses, the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

In any of the foregoing clauses, the unducted fan propulsor is undermounted to the airfoil with one or more intermediate structures.

In any of the foregoing clauses, the P of the unducted fan propulsor is variable to accommodate different operating conditions.

In any of the foregoing clauses, the aircraft includes a plurality of the unducted fan propulsors.

In the foregoing clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

What is claimed is:

1. An aircraft comprising:
   a fuselage;
   an airfoil extending from the fuselage, the airfoil having an airfoil section with a leading edge (LE) and a trailing edge (TE), a chord extending between the LE and TE, and a quarter-chord location (QC) along the chord measured from the LE;
   an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of:
   (a) wherein the plurality of blades is arranged in a single array, the point P is located at an intersection of the CL and a line perpendicular to the CL that passes through a midpoint between edges at the root of one of the plurality of blades, and
   (b) wherein the plurality of blades is arranged in a forward array and a rearward array, the point P is located at an intersection of the CL and midpoint between a rearward trailing edge (RTL) of the rearward array and leading edge (LE) of the forward array when a blade of the forward and rearward arrays are aligned with each other; and
   an ellipse origin positioning line (EOR) having a length (EORL) extending from the QC to an ellipse origin (OR) and at an angle $\theta$ as measured from a vector from the QC to the TE of the airfoil section to the line EOR, where, when viewed with the LE to the left of TE, a positive $\theta$ (1) increases in a counter-clockwise direction when the high pressure side of the airfoil section is below the airfoil section, and (2) increases in a clockwise direction when the high pressure side of the airfoil section is above the airfoil section, and
   wherein the P of the unducted fan propulsor is located within a first ellipse having a first major axis length (1MajAL) and a first minor axis length (1MinAL) with a first ellipse origin defined by EORL/D of 0.938 and $\theta$ of 253.6°, and where 1MajAL/D is 2.8 and 1MinAL/D is 1.7.

2. The aircraft of claim 1, wherein the P of the unducted fan propulsor is located in a second ellipse having a second major axis length (2MajAL) and a second minor axis length (2MinAL) with a second ellipse origin defined by EORL/D of 1.051 and $\theta$ of 228.8°, and where 2MajAL/D is 1.86 and 2MinAL/D is 1.56.

3. The aircraft of claim 1, wherein the P of the unducted fan propulsor is located in a third ellipse having a third major axis length (3MajAL) and a third minor axis length (3MinAL) with a third ellipse origin defined by EORL/D of 0.870 and $\theta$ of 239.6°, where 3MajAL/D is 1.4 and 3MinAL/D is 0.9.

4. The aircraft of claim 1, wherein the P of the unducted fan propulsor is located in a fourth ellipse having a fourth major axis length (4MajAL) and a fourth minor axis length (4MinAL) with a fourth ellipse origin defined by EORL/D of 0.763 and $\theta$ of 235.7°, and where 4MajAL/D is 0.94 and 4MinAL/D is 0.44.

5. The aircraft of claim 1, wherein the unducted fan propulsor is undermounted to the airfoil with one or more intermediate structures.

6. The aircraft of claim 1, wherein the P of the unducted fan propulsor is variable to accommodate different operating conditions.

7. An aircraft comprising:
   a fuselage;
   an airfoil extending from the fuselage, the airfoil having an airfoil section with a leading edge (LE) and a trailing edge (TE), a chord extending between the LE and TE, and a quarter-chord location (QC) along the chord measured from the LE;
   an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of:
   (a) wherein the plurality of blades is arranged in a single array, the point P is located at an intersection of the CL and a line perpendicular to the CL that passes through a midpoint between edges at the root of one of the plurality of blades, and
   (b) wherein the plurality of blades is arranged in a forward array and a rearward array, the point P is located at an intersection of the CL and midpoint between a rearward trailing edge (RTL) of the rearward array and leading edge (LE) of the forward array when a blade of the forward and rearward arrays are aligned with each other; and
   a positioning line (R) having a length (RL) and extending from the QC to the point P of the unducted fan propulsor and at an angle $\theta$ as measured from a vector from the QC to the TE of the airfoil section to the line R, where, when viewed with the LE to the left of TE, a positive $\theta$ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and $\theta$ is between 187° and 340°, and wherein RL/D and $\theta$ of the P of the unducted fan propulsor adhere to the following expressions:

$$\frac{RL}{D} + \frac{\left(\sqrt{1.4161 * [1.88978 * \sin^2(\theta) - 0.0875 * \cos^2(\theta) + 0.477 * \sin(\theta) * \cos(\theta)]} + 1.764 * \sin(\theta) + 0.19146 * \cos(\theta)\right)}{1.96 * \sin^2(\theta) + 0.7225 * \cos^2(\theta)} > 0$$

and $$\frac{RL}{D} + \frac{\left(-\sqrt{1.4161 * [1.88978 * \sin^2(\theta) - 0.0875 * \cos^2(\theta) + 0.477 * \sin(\theta) * \cos(\theta)]} + 1.764 * \sin(\theta) + 0.19146 * \cos(\theta)\right)}{1.96 * \sin^2(\theta) + 0.7225 * \cos^2(\theta)} < 0.$$

8. The aircraft of claim 7, wherein:
0.254<RL/D<1.86 and θ is between 199° and 306°, and the P of the unducted fan propulsor is defined by the following expressions:

$$\frac{RL}{D} + \frac{\left(\sqrt{0.52621 * \left[0.7205 * \sin^2(\theta) - 0.352 * \cos^2(\theta) + 0.7448 * \sin(\theta) * \cos(\theta)\right]} + 0.8476 * \sin(\theta) + 0.23119 * \cos(\theta)\right)}{0.8649 * \sin^2(\theta) + 0.6084 * \cos^2(\theta)} > 0$$

and $$\frac{RL}{D} + \frac{\left(-\sqrt{0.52621 * \left[0.7205 * \sin^2(\theta) - 0.352 * \cos^2(\theta) + 0.7448 * \sin(\theta) * \cos(\theta)\right]} + 0.8476 * \sin(\theta) + 0.23119 * \cos(\theta)\right)}{0.8649 * \sin^2(\theta) + 0.6084 * \cos^2(\theta)} < 0.$$

9. The aircraft of claim 7, wherein:
0.369<RL/D<1.43 and θ is between 204° and 291°, and the P of the unducted fan propulsor is defined by the following expressions:

$$\frac{RL}{D} + \frac{\left(\sqrt{0.09923 * \left[0.2964 * \sin^2(\theta) - 0.36 * \cos^2(\theta) + 0.66 * \sin(\theta) * \cos(\theta)\right]} + 0.3675 * \sin(\theta) + 0.0891 * \cos(\theta)\right)}{0.49 * \sin^2(\theta) + 0.2025 * \cos^2(\theta)} > 0$$

and $$\frac{RL}{D} + \frac{\left(-\sqrt{0.09923 * \left[0.2964 * \sin^2(\theta) - 0.36 * \cos^2(\theta) + 0.66 * \sin(\theta) * \cos(\theta)\right]} + 0.3675 * \sin(\theta) + 0.0891 * \cos(\theta)\right)}{0.49 * \sin^2(\theta) + 0.2025 * \cos^2(\theta)} < 0.$$

10. The aircraft of claim 7, wherein:
0.477<RL/D<0.9455 and θ is between 211° and 274°, and the P of the unducted fan propulsor is defined by the following expressions:

$$\frac{RL}{D} + \frac{\left(\sqrt{0.01069156 * \left[0.036 * \sin^2(\theta) - 0.3485 * \cos^2(\theta) + 0.5418 * \sin(\theta) * \cos(\theta)\right]} + 0.139167 * \sin(\theta) + 0.020812 * \cos(\theta)\right)}{0.2209 * \sin^2(\theta) + 0.0484 * \cos^2(\theta)} > 0$$

and $$\frac{RL}{D} + \frac{\left(-\sqrt{0.01069156 * \left[0.036 * \sin^2(\theta) - 0.3485 * \cos^2(\theta) + 0.5418 * \sin(\theta) * \cos(\theta)\right]} + 0.139167 * \sin(\theta) + 0.020812 * \cos(\theta)\right)}{0.2209 * \sin^2(\theta) + 0.0484 * \cos^2(\theta)} < 0.$$

11. The aircraft of claim 7, wherein the unducted fan propulsor is undermounted to the airfoil with one or more intermediate structures.

12. The aircraft of claim 7, wherein the P of the unducted fan propulsor is variable to accommodate different operating conditions.

13. An aircraft comprising:
a fuselage;
an airfoil extending from the fuselage, the airfoil having an airfoil section with a leading edge (LE) and a trailing edge (TE), a chord extending between the LE and TE, and a quarter-chord location (QC) along the chord measured from the LE;
an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of:

(a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (RTL) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

14. The aircraft of claim 13, wherein 0.15≤RL/D.

15. The aircraft of claim 13, wherein 0.35≤RL/D, and preferably RL/D is about 0.72.

16. The aircraft of claim 13, wherein θ is between 198° and 310°, and preferably between 205° and 285°.

17. The aircraft of claim 13, wherein the unducted fan propulsor operates at a cruise flight Mach $M_0$ of between 0.5 and 0.9, preferably between 0.7 and 0.9, and more preferably between 0.75 and 0.9.

18. The aircraft of claim 13, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

19. The aircraft of claim 13, wherein the unducted fan propulsor is undermounted to the airfoil with one or more intermediate structures.

20. The aircraft of claim 13, wherein the P of the unducted fan propulsor is variable to accommodate different operating conditions.

21. The aircraft of claim 1, wherein the plurality of blades are arranged in two arrays, with the forward array being rotating and the rearward array being non-rotating.

22. The aircraft of claim 7, wherein the plurality of blades are arranged in two arrays, with the forward array being rotating and the rearward array being non-rotating.

23. The aircraft of claim 13, wherein the plurality of blades are arranged in two arrays, with the forward array being rotating and the rearward array being non-rotating.

\* \* \* \* \*

UNITED STATES PATENT AND TRADEMARK OFFICE
CERTIFICATE OF CORRECTION

| | | |
|---|---|---|
| PATENT NO. | : 12,365,471 B2 | Page 1 of 1 |
| APPLICATION NO. | : 18/230609 | |
| DATED | : July 22, 2025 | |
| INVENTOR(S) | : Sara Elizabeth Carle et al. | |

It is certified that error appears in the above-identified patent and that said Letters Patent is hereby corrected as shown below:

On the Title Page

Item (72), under "Inventors", in Column 1, Line 2, delete "Daniel L Tweedt," and insert
-- Daniel L. Tweedt, --, therefor.

Signed and Sealed this
Ninth Day of December, 2025

John A. Squires
*Director of the United States Patent and Trademark Office*